United States Patent
Aimono

(10) Patent No.: US 9,519,137 B2
(45) Date of Patent: Dec. 13, 2016

(54) OPTICAL DEFLECTOR INCLUDING INNER FRAME WITH CIRCUMFERENTIAL RIB AND BRANCH RIBS

(71) Applicant: STANLEY ELECTRIC CO., LTD., Meguro-ku, Tokyo (JP)

(72) Inventor: Takanori Aimono, Tokyo-to (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/667,440

(22) Filed: Mar. 24, 2015

(65) Prior Publication Data

US 2015/0277107 A1    Oct. 1, 2015

(30) Foreign Application Priority Data

Mar. 25, 2014    (JP) .................................. 2014-062706

(51) Int. Cl.
*G02B 26/08* (2006.01)

(52) U.S. Cl.
CPC ................................ *G02B 26/0858* (2013.01)

(58) Field of Classification Search
CPC . G02B 26/0858; G02B 26/101; G02B 26/105; H01L 41/00
USPC ...................... 359/198.1, 199.4, 200.8, 202.1
See application file for complete search history.

(56) References Cited

U.S. PATENT DOCUMENTS

| | | | | |
|---|---|---|---|---|
| 2004/0263937 | A1* | 12/2004 | Fujii ................... | G02B 26/0841 359/199.1 |
| 2010/0195180 | A1* | 8/2010 | Akanuma .......... | G02B 26/0858 359/200.8 |
| 2013/0063800 | A1* | 3/2013 | Naono .................... | G02B 26/08 359/200.8 |
| 2013/0083379 | A1 | 4/2013 | Tanaka et al. | |
| 2014/0268268 | A1* | 9/2014 | Kin ....................... | G02B 26/105 359/200.6 |
| 2014/0355091 | A1* | 12/2014 | Mizutani ............ | G02B 26/0858 359/212.1 |

FOREIGN PATENT DOCUMENTS

JP    2013080068 A    5/2013

* cited by examiner

*Primary Examiner* — Frank Font
(74) *Attorney, Agent, or Firm* — Holtz, Holtz & Volek PC

(57) ABSTRACT

An optical deflector includes a mirror, an inner frame surrounding the mirror, first and second torsion bars coupled between the mirror and the inner frame, first and second inner piezoelectric actuators coupled between the first and second torsion bars supported by first and second inner coupling portions to the inner frame, and an outer frame surrounding the inner frame. The inner frame is supported by first and second outer coupling portions to the outer frame. A circumferential rib is provided on a rear surface of the inner frame. A first branch rib is provided on a rear surface of the first outer coupling portion, and a second branch rib is provided on a rear surface of the second outer coupling portion.

7 Claims, 18 Drawing Sheets

OPTICAL DEFLECTOR INCLUDING INNER FRAME WITH CIRCUMFERENTIAL RIB AND BRANCH RIBS

This application claims the priority benefit under 35 U.S.C. §119 to Japanese Patent Application No. JP2014-062706 filed on Mar. 25, 2014, which disclosure is hereby incorporated in its entirety by reference.

BACKGROUND

Field

The presently disclosed subject matter relates to an optical deflector. The optical deflector can be applied as an optical scanner to a laser projector, a laser radar, a bar code reader, an area sensor, a head lamp, a head-up display unit, and other optical apparatus, to generate scanning light.

Description of the Related Art

Generally, in an optical scanner or the like, an optical deflector is constructed by a micro electro mechanical system (MEMS) device manufactured by using semiconductor manufacturing processes and micro machine technology.

A prior art optical deflector as a MEMS device is constructed by a mirror, an inner frame surrounding the mirror, a pair of torsion bars coupled between the mirror and the inner frame along an axis (X-axis), inner piezoelectric actuators coupled between the torsion bars and supported by the inner frame via inner coupling portions, serving as cantilevers for rocking the mirror with respect to the X-axis of the mirror, and an outer frame surrounding the inner frame via outer coupling portions (see: JP2013-080068 & US2013/0083379A1). In the above-described prior art optical deflector, the inner frame is very thick to have a high rigidity to sufficiently support the inner piezoelectric actuators. For example, the thickness of the inner frame is three or more times that of the piezoelectric actuators.

In the above-described prior art optical deflector, however, the rigidity of the outer coupling portions between the inner frame and the outer frame is small as compared with that of the inner frame. As a result, the resonant energy of the mirror is consumed by the inner frame, and in addition, a part of the resonant energy is leaked via the outer coupling portions to the outer frame. This means that the energy of the mirror energized by the piezoelectric actuators at the resonant frequency cannot be concentrated on the mirror, and this energy is dispersed into a frequency region around the resonant frequency, so that the quality factor Q of the mirror and the torsion bars at the resonant frequency would be decreased.

The quality factor Q is defined by $Q=f_r/(f_b-f_a)$ where $f_r$ is the resonant frequency;

$f_a$ is a frequency lower than the resonant frequency $f_r$ at which the vibration energy is a half value of the vibration energy at the resonant frequency $f_r$; and $f_b$ is a frequency higher than the resonant frequency $f_r$ at which the vibration energy is half the value of the vibration energy at the resonant frequency $f_r$.

The decrease of the quality factor Q would increase the drive voltages at the piezoelectric actuators in order to realize a desired deflection angle of the mirror.

SUMMARY

The presently disclosed subject matter seeks to solve the above-described problems.

According to the presently disclosed subject matter, an optical deflector includes a mirror having first and second axes on a plane of the mirror, an inner frame surrounding the mirror, first and second torsion bars coupled between the mirror and the inner frame along the first axis, a first inner piezoelectric actuator coupled between the first and second torsion bars and supported by a first inner coupling portion to the inner frame, a second inner piezoelectric actuator coupled between the first and second torsion bars and supported by a second inner coupling portion to the inner frame, and an outer frame surrounding the inner frame. The inner frame is supported by first and second outer coupling portions to the outer frame. The second inner coupling portion is opposite to the first inner coupling portion with respect to the first axis, and also, the first and second outer coupling portions are opposite with respect to the first axis. A circumferential rib is provided on a rear surface of the inner frame. A first branch rib is provided on a rear surface of the first outer coupling portion, and a second branch rib is provided on a rear surface of the second outer coupling portion. The first and second inner coupling portions and the first and second outer coupling portions are arranged along the second axis.

According to the presently disclosed subject matter, since the rigidity of the inner frame is substantially increased by the circumferential rib, the energy of the mirror and the torsion bars energized by the inner piezoelectric actuators at the resonant frequency would be concentrated on the mirror within the inner frame, and also, the leakage of the energy via the outer coupling portions to the outer frame would be avoided by the branch ribs. Thus, the quality factor Q of the resonant structure formed by the mirror, the torsion bars and the inner piezoelectric actuators at the resonant frequency would be increased to reduce the drive voltages of the inner piezoelectric actuators.

BRIEF DESCRIPTION OF THE DRAWINGS

The above and other advantages and features of the presently disclosed subject matter will be more apparent from the following description of certain embodiments, taken in conjunction with the accompanying drawings, wherein.

DETAILED DESCRIPTION OF EXEMPLARY EMBODIMENTS

Figure 1:
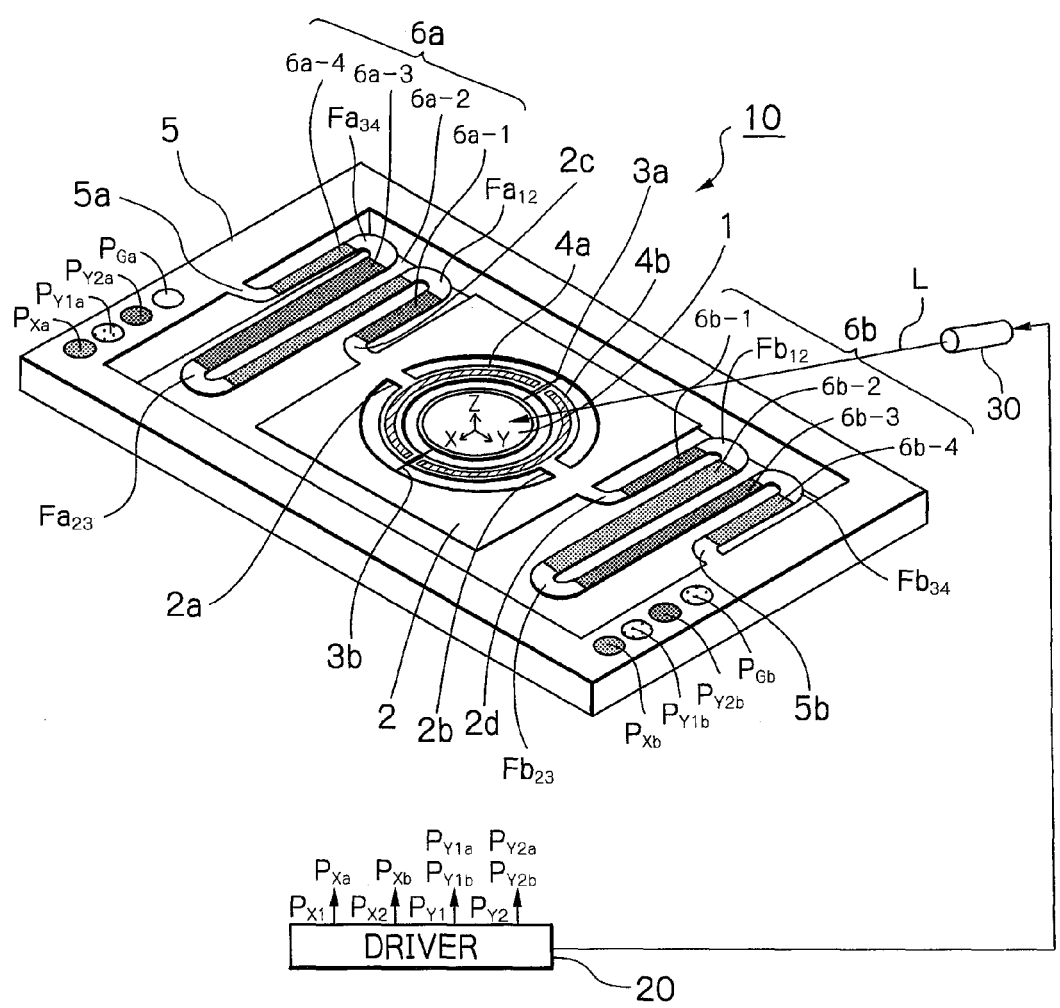
FIG. 1 is a front-side perspective view illustrating a first embodiment of the optical deflector according to the presently disclosed subject matter.

In FIG. 1, which illustrates a first embodiment of the optical deflector according to the presently disclosed subject matter, reference numeral 10 designates a two-dimensional optical deflector, 20 designates a driver for driving the optical deflector 10, and 30 designates a laser light source.

The optical deflector 10 is constructed by a circular mirror 1 for reflecting incident light L from the laser light source 30, an inner frame 2 surrounding the mirror 1 for supporting the mirror 1, a pair of torsion bars 3a and 3b coupled between the mirror 1 and the inner frame 2 along an X-axis, a semi-ring shaped inner piezoelectric actuator 4a coupled between the torsion bars 3a and 3b and supported by an inner coupling portion 2a of the inner frame 2, and a semi-ring shaped inner piezoelectric actuator 4b coupled between the torsion bars 3a and 3b and supported by an inner coupling portion 2b of the inner frame 2. In this case, the inner frame 2 has a circular inner circumference along the inner piezoelectric actuators 4a and 4b, and a rectangular outer circumference. The flexing direction of the inner piezoelectric actuator 4a is opposite to that of the inner piezoelectric actuator 4b, so that the inner piezoelectric actuators 4a and 4b serve as cantilevers for rocking the mirror 1 around the X-axis.

Also, the optical deflector 10 includes an outer frame 5 and a pair of meander-type outer piezoelectric actuators 6a and 6b coupled between outer coupling portions 2c and 2d of the inner frame 2 and coupling portions of 5a and 5b of the outer frame 5 and serving as cantilevers for rocking the mirror 1 around a Y-axis on the plane of the mirror 1 centered at the center 0 of the mirror 1. The outer piezoelectric actuators 6a and 6b are arranged opposite to each other with respect to the mirror 1.

The mirror 1 can be square, rectangular, polygonal or elliptical. In this case, the inner-circumference of the inner frame 2 is adapted to the shape of the mirror 1.

Note that a normal axis to the plane of the mirror 1 is defined by a Z-axis centered at the center 0 of the mirror 1.

In more detail, the torsion bars 3a and 3b have ends coupled to the outer circumference of the mirror 1 and other ends coupled to the inner circumference of the inner frame 2. Therefore, the torsion bars 3a and 3b are twisted by the inner piezoelectric actuators 4a and 4b to rock the mirror 1 around the X-axis.

The outer frame 5 is rectangularly-framed to surround the inner frame 2 associated with the meander-type outer piezoelectric actuators 6a and 6b.

The meander-type outer piezoelectric actuator 6a is constructed by piezoelectric cantilevers 6a-1, 6a-2, 6a-3 and 6a-4 which are serially-coupled from the coupling portion 2c of the inner frame 2 to the coupling portion 5a of the outer frame 5 via folded portions $Fa_{12}$, $Fa_{23}$ and $Fa_{34}$. The folded portions $Fa_{12}$, and $Fa_{34}$ are located on the negative side of the X-axis, while the folded portion $Fa_{23}$ is located on the positive side of the X-axis. Also, each of the piezoelectric cantilevers 6a-1, 6a-2, 6a-3 and 6a-4 is in parallel with the X-axis. Therefore, the piezoelectric cantilevers 6a-1, 6a-2, 6a-3 and 6a-4 are folded at every cantilever or meandering from the inner frame 2 to the outer frame 5, so that the amplitudes of the piezoelectric cantilevers 6a-1, 6a-2, 6a-3 and 6a-4 can be changed along directions perpendicular to the Y-axis.

Similarly, the meander-type outer piezoelectric actuator 6b is constructed by piezoelectric cantilevers 6b-1, 6b-2, 6b-3 and 6b-4 which are serially-coupled from the outer coupling portion 2d of the inner frame 2 to the coupling portion 5b of the outer frame 5 via folded portions $Fb_{12}$, $Fb_{23}$ and $Fb_{34}$. The folded portions $Fb_{12}$ and $Fb_{34}$ are located on the negative side of the X-axis, while the folded portion $Fb_{23}$ is located on the positive side of the X-axis. Also, each of the piezoelectric cantilevers 6b-1, 6b-2, 6b-3 and 6b-4 are in parallel with the X-axis. Therefore, the piezoelectric cantilevers 6b-1, 6b-2, 6b-3 and 6b-4 are folded at every cantilever or meandering from the inner frame 2 to the outer frame 5, so that the piezoelectric cantilevers 6b-1, 6b-2, 6b-3 and 6b-4 can be changed along directions perpendicular to the Y-axis.

The length of each of the piezoelectric cantilevers 6a-1 and 6a-4 is about half of that of each of the piezoelectric cantilevers 6a-2 and 6a-3. Similarly, the length of each of the piezoelectric cantilevers 6b-1 and 6b-4 is about half of that of each of the piezoelectric cantilevers 6b-2 and 6b-3. Thus, the rocking axis of the mirror 1 is brought to the Y-axis.

The meander-type outer piezoelectric actuators 6a and 6b operate as follows.

In the outer piezoelectric actuators 6a and 6b, the piezoelectric cantilevers 6a-1, 6a-2, 6a-3, 6a-4, 6b-1, 6b-2, 6b-3 and 6b-4 are divided into an odd-numbered group of the piezoelectric cantilevers 6a-1 and 6a-3; 6b-1 and 6b-3, and an even-numbered group of the piezoelectric cantilevers 6a-2 and 6a-4; 6b-2 and 6b-4 alternating with the odd-numbered group of the piezoelectric cantilevers 6a-1 and 6a-3; 6b-1 and 6b-3.

For example, when the odd-numbered group of the piezoelectric cantilevers 6a-1, 6a-3, 6b-1 and 6b-3 are flexed in one direction, for example, in an upward direction, the even-numbered group of the piezoelectric cantilevers 6a-2, 6a-4, 6b-2 and 6b-4 are flexed in the other direction, i.e., in a downward direction. On the other hand, when the odd-numbered group of the piezoelectric cantilevers 6a-1, 6a-3, 6b-1 and 6b-3 are flexed in the downward direction, the even-numbered group of the piezoelectric cantilevers 6a-2, 6a-4, 6b-2 and 6b-4 are flexed in the upward direction. In this case, since the length of each of the piezoelectric cantilevers 6a-1, 6a-4, 6b-1 and 6b-4 is about half of that of each of the piezoelectric cantilevers 6a-2, 6a-3, 6b-2 and 6b-3, the flexing amounts of the piezoelectric cantilevers 6a-1, 6a-4, 6b-1 and 6b-4 are about half of those of the piezoelectric cantilevers 6a-2, 6a-3, 6b-2 and 6b-3.

Thus, the mirror 1 is rocked around the Y-axis.

Note that the number of piezoelectric cantilevers in each of the outer piezoelectric actuators 6a and 6b can be other values such as 3, 5, 6, 7, . . . .

Provided on the outer frame 5 are pads $P_{Ga}$, $P_{Xa}$, $P_{Y1a}$, $P_{Y2a}$, $P_{Gb}$, $P_{Y1b}$ and $P_{Y2b}$ which are connected to the driver 20. The driver 20 applies a drive voltage $V_{X1}$ to the pad $P_{Xa}$ and applies a drive voltage $V_{X2}$ to the pad $P_{Xb}$. The drive voltages $V_{X1}$ and $V_{X2}$ are sinusoidal, and the drive voltage $V_{X1}$ is opposite in phase to the drive voltage $V_{X2}$. For example, the frequency of the drive voltages $V_{X1}$ and $V_{X2}$ is one resonant frequency $f_r$ such as 25.3 kHz depending upon a resonant structure formed by the mirror 1, the torsion bars 3a and 3b and the inner piezoelectric actuators 4a and 4b. On the other hand, the driver 20 applies a drive voltage $V_{Y1}$ to the pads $P_{Y1a}$ and $P_{Y1b}$, and applies a drive voltage $V_{Y2}$ to the pads $P_{Y2a}$ and $P_{Y2b}$. The drive voltages $V_{Y1}$ and $V_{Y2}$ are sinusoidal or saw-tooth-shaped, and the drive voltage $V_{Y1}$ is opposite in phase to the drive voltage $V_{Y2}$. For example, the frequency of the drive voltages $V_{Y1}$ and $V_{Y2}$ is 60 Hz, much lower than the resonant frequency $f_r$.

The pad $P_{Ga}$, which is grounded, is connected via a via-structure (not shown) to the Pt lower electrode layers 204 (see: FIG. 2B) of the inner piezoelectric actuator 4a and the piezoelectric cantilevers 6a-1, 6a-2, 6a-3 and 6a-4 of the outer piezoelectric actuator 6a.

The pad $P_{Xa}$ is connected via a wiring layer (not shown) to the Pt upper electrode layers 206 (see: FIG. 2B) of the inner piezoelectric actuator 4a.

The pad $P_{Y1a}$ is connected via a wiring layer (not shown) to the Pt upper electrode layers 206 (see: FIG. 2B) of the odd-numbered piezoelectric cantilevers 6a-1 and 6a-3 of the outer piezoelectric actuator 6a.

The pad $P_{Y2a}$ is connected via a wiring layer (not shown) to the Pt upper electrode layers 206 (see: FIG. 2B) of the even-numbered piezoelectric cantilevers 6a-2 and 6a-4 of the outer piezoelectric actuator 6a.

The pad $P_{Gb}$, which is grounded, is connected via a via-structure (not shown) to the Pt lower electrode layers 204 (see: FIG. 2B) of the inner piezoelectric actuator 4b and the piezoelectric cantilevers 6b-1, 6b-2, 6b-3 and 6b-4 of the outer piezoelectric actuator 6b.

The pad $P_{Xb}$ is connected via a wiring layer (not shown) to the Pt upper electrode layers 206 (see: FIG. 2B) of the inner piezoelectric actuator 4b.

The pad $P_{Y1b}$ is connected via a wiring layer (not shown) to the Pt upper electrode layers 206 (see: FIG. 2B) of the odd-numbered piezoelectric cantilevers 6b-1 and 6b-3 of the outer piezoelectric actuator 6b.

The pad $P_{Y2b}$ is connected via a wiring layer (not shown) to the Pt upper electrode layers 206 (see: FIG. 2B) of the even-numbered piezoelectric cantilevers 6b-2 and 6b-4 of the outer piezoelectric actuator 6b.

The driver 20 is constructed by a control circuit such as a microcomputer including a central processing unit (CPU), a read-only memory (ROM) or a nonvolatile memory, a random access memory (RAM), an input/output (I/O) interface and the like.

Figure 2A:
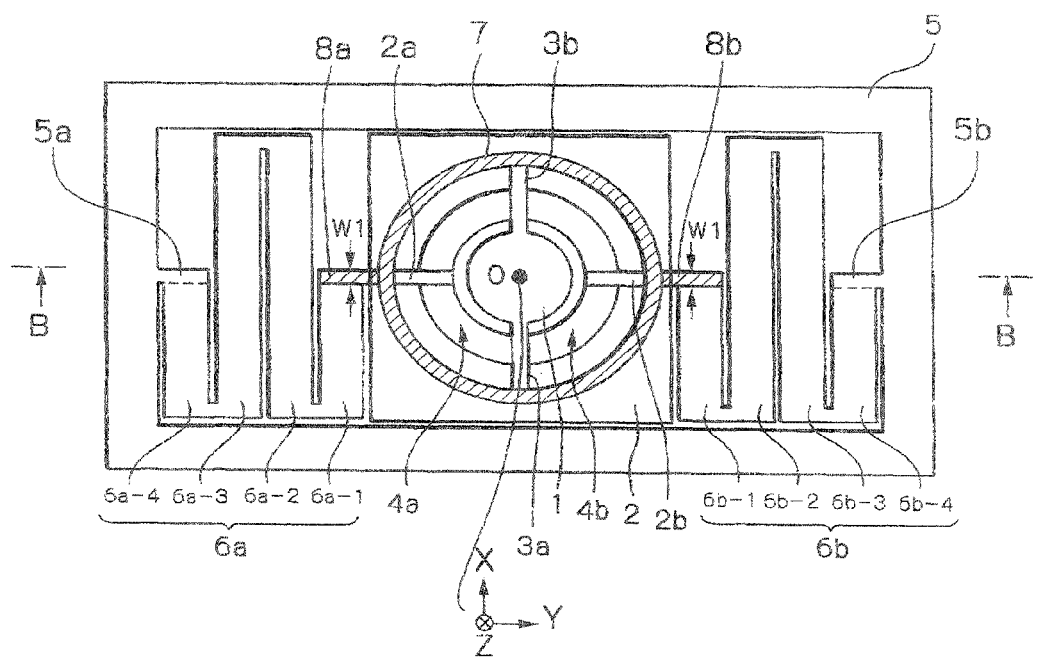
FIG. 2A is a rear-side view of the optical deflector of FIG. 1.
Figure 2B:
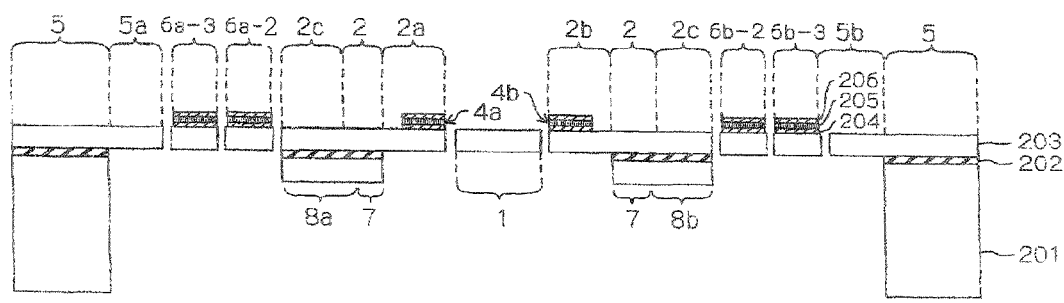
FIG. 2B is a cross-sectional view taken along the line B-B in FIG. 2A.

FIG. 2A is a rear-side view of the optical deflector of FIG. 1, and FIG. 2B is a cross-sectional view taken along the line B-B in FIG. 2A.

In order to increase the quality factor Q of the resonant structure formed by the mirror 1, the torsion bars 3a and 3b and the inner piezoelectric actuators 4a and 4b, an about 150 µm thick circumferential rib 7 is provided on an inner circumference portion of a rear surface of the inner frame 2. In this case, the width of the circumferential rib 7 is smaller than that of the inner frame 2. Also, about 150 µm thick branch ribs 8a and 8b are provided from the outer circumference of the circumferential rib 7 to the outer coupling portion 2c and 2d of the rear surface of the inner frame 2 along the Y-axis. In FIG. 2A, note that the circumferential rib 7 and the branch ribs 8a and 8b are shaded to easily specify them. The thickness of the inner frame 2 including the circumferential rib 7 is the same as that of the outer coupling portions 2c and 2d including the branch ribs 8a and 8b. Also, the width W1 of the branch ribs 8a and 8b including the outer coupling portions 2c and 2d is relatively small, i.e., 120 µm.

The structure of the optical deflector 10 is explained next with reference to FIG. 2B.

In FIG. 2B, a monocrystalline silicon support layer ("Handle" layer) 201, an intermediate silicon dioxide layer ("Box" layer) 202 and a monocrystalline silicon active layer ("Device" layer) 203 are formed by a silicon-on-insulator (SOI) substrate. Also, a silicon dioxide layer (not shown) is formed on the front surface of the SOI by a thermal oxidizing process.

The mirror 1 is constructed by the "Device" layer 203 serving as a vibration plate and a Ti/Ag reflective metal layer (not shown) formed on the "Device" layer 203.

The inner frame 2 and the torsion bars 3a and 3b are constructed by the "Device" layer 203.

Each of the piezoelectric cantilevers 4a, 4b, 6a-1 to 6a-4 and 6b-1 to 6b-4 is constructed by the "Device" layer 203, the silicon dioxide layer (not shown), a Pt lower electrode layer 204, a lead titanate zirconate (PZT) layer 205 and a Pt upper electrode layer 206.

The outer frame 5 is constructed by the "Handle" layer 201, the "Box" layer 202, the "Device" layer 203 and the silicon dioxide layer (not shown).

The pads $P_{Ga}$, $P_{Xa}$, $P_{Y1a}$, $P_{Y2a}$, $P_{Gb}$, $P_{Xb}$, $P_{Y1b}$ and $P_{Y2b}$ are constructed by a pad metal layer (not shown).

The circumferential rib 7 and the branch ribs 8a and 8b are formed by a part of the "Handle" layer 201. For example, a photolithography and dry etching process is performed upon the "Handle" layer 201; in this case, the dry etching process is stopped before the "Handle" layer 201 is completely removed.

When the optical deflector of FIGS. 1, 2A and 2B was driven by applying the drive voltages $V_{X1}$ and $V_{X2}$ whose frequency $F_X$ was changed from 24 kHz to 28 kHz, a deflection 10 angle signal was detected by a position sensitive detector (PSD). As a result, the deflection angle $\theta_X$ with respect to the X-axis, and a phase difference PD between the phase of the drive voltages $V_{X1}$ and $V_{X2}$ and the deflection angle signal, were as illustrated in FIG. 3.

Figure 3:
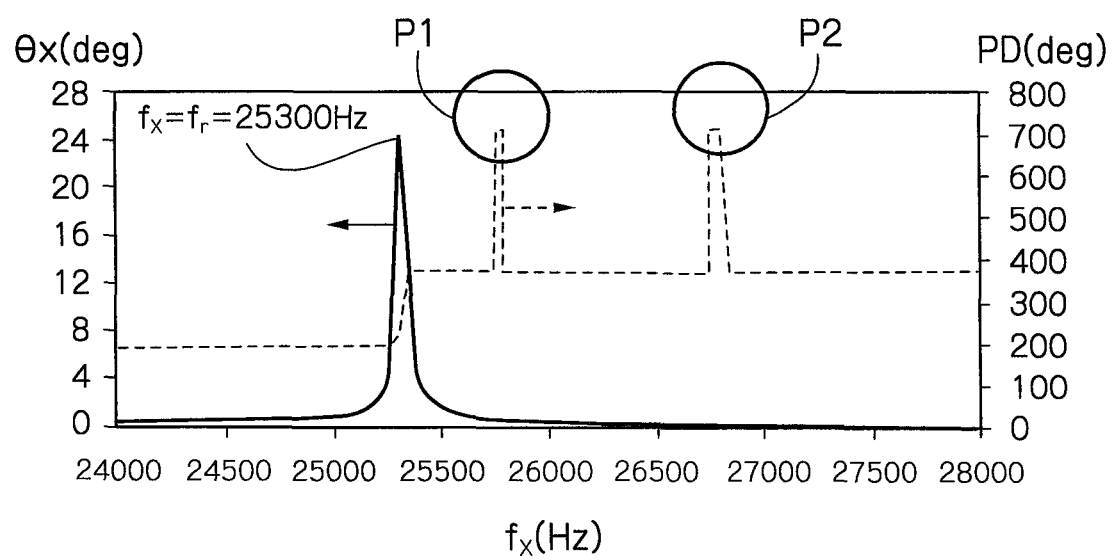
FIG. 3 is a graph showing the deflection angle with respect to the X-axis and a phase difference between the phase of the drive voltages and the deflection angle signal of FIGS. 2A and 2B.

In FIG. 3, the maximum deflection angle $\theta_X$ was at 25.3 kHz, i.e., one resonant frequency $f_r$. The quality factor Q was large when the amplitude of the drive voltages $V_{X1}$ and $V_{X2}$ was larger than 6V. In this case, the resonant frequency $f_r$ is determined by the resonant structure formed by the mirror 1, the torsion bars 3a and 3b, and the inner piezoelectric actuators 4a and 4b.

On the other hand, the phase difference PD rose from 180° to 360° at a frequency a little smaller than the resonant frequency $f_X=f_r=25.3$ kHz.

However, the phase difference PD was very large) (≈720° at $f_X=25.7$ kHz and $f_X=26.8$ kHz. An operation mode P1 at $f_X=25.7$ kHz is called a pumping mode due to the translation mode of the mirror 1 along the Z-axis, while an operation mode P2 at $f_X=26.8$ kHz is due to the fact that the meander-type outer piezoelectric actuators 6a and 6b may be moved along the X-axis to rock the mirror 1 around the X-axis.

Figure 4A:
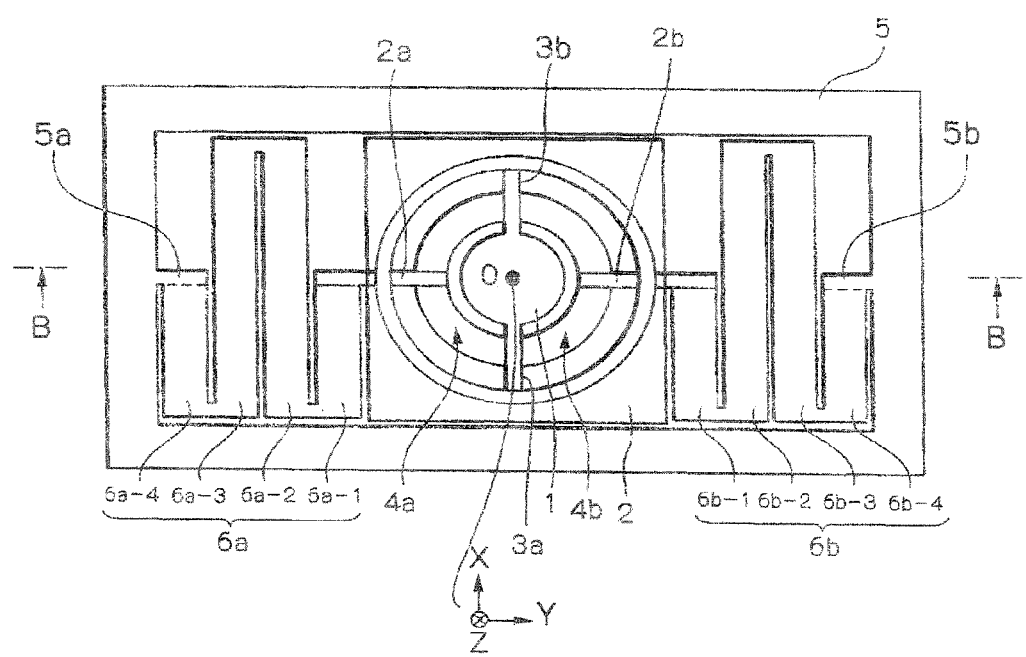
FIG. 4A is a rear-side view of a comparative example against the optical deflector of FIG. 2A.
Figure 4B:
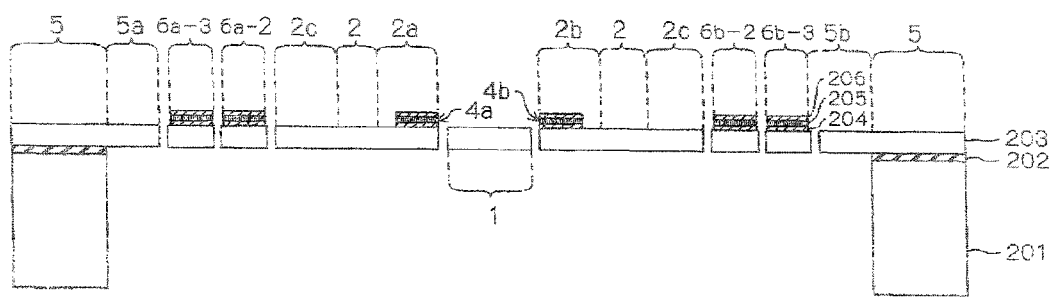
FIG. 4B is a cross-sectional view taken along the line B-B in FIG. 4A.

FIG. 4A is a rear-side view of a comparative example against the optical deflector of FIG. 2A, and FIG. 4B is a cross-sectional view taken along the line B-B in FIG. 4A.

In FIGS. 4A and 4B, the circumferential rib 7 and the branch ribs 8a and 8b are removed from the optical deflector of FIGS. 2A and 2B.

Figure 5:
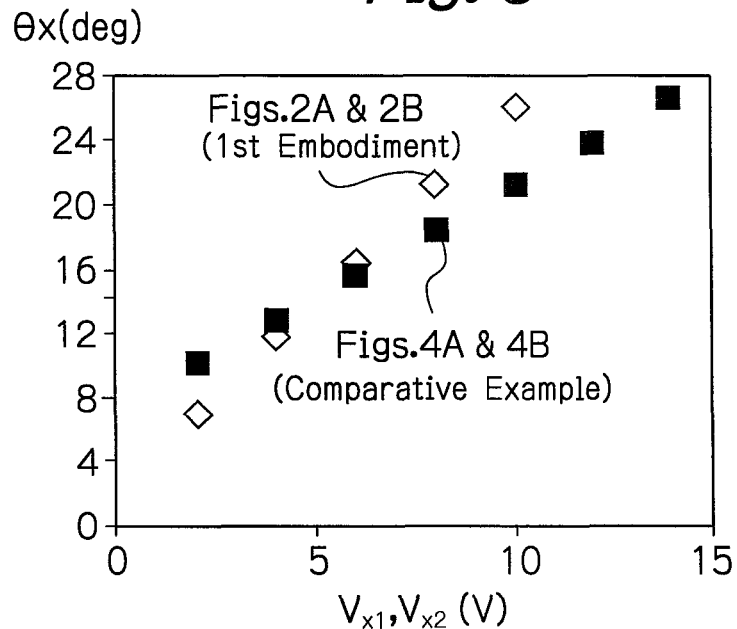
FIG. 5 is a diagram illustrating drive voltage-to-deflection angle characteristics between the optical deflector of FIGS. 2A and 2B and the comparative example of FIGS. 4A and 4B.

As illustrated in FIG. 5, when the drive voltage $V_{X1}(V_{X2})$ is lower than 5V, the deflection angle $\theta_X$ of the optical deflector of FIGS. 2A and 2B is smaller than the deflection angle $\theta_X$ of the optical deflector of FIGS. 4A and 4B.

On the other hand, when the drive voltage $V_{X1}(V_{X2})$ is higher than 5V, the deflection angle $\theta_X$ of the optical deflector of FIGS. 2A and 2B is larger than the deflection angle $\theta_X$ of the optical deflector of FIGS. 4A and 4B.

According to FIG. 5, when the drive voltages $V_{X1}$ and $V_{X2}$ are higher than 5 V, the deflection angle $\theta_X$ can be increased by the optical deflector of FIGS. 2A and 2B. In other words, in order to realize the same deflection angle $\theta_X$ such as 24°, the optical deflector of FIGS. 2A and 2B is driven by $V_{X1}=V_{X2}=8.5V$, while the optical deflector of FIGS. 4A and 4B is driven by $V_{X1}=V_{X2}=11.5V$. Thus, the drive voltages $V_{X1}$ and $V_{X2}$ can be decreased.

Figure 6:
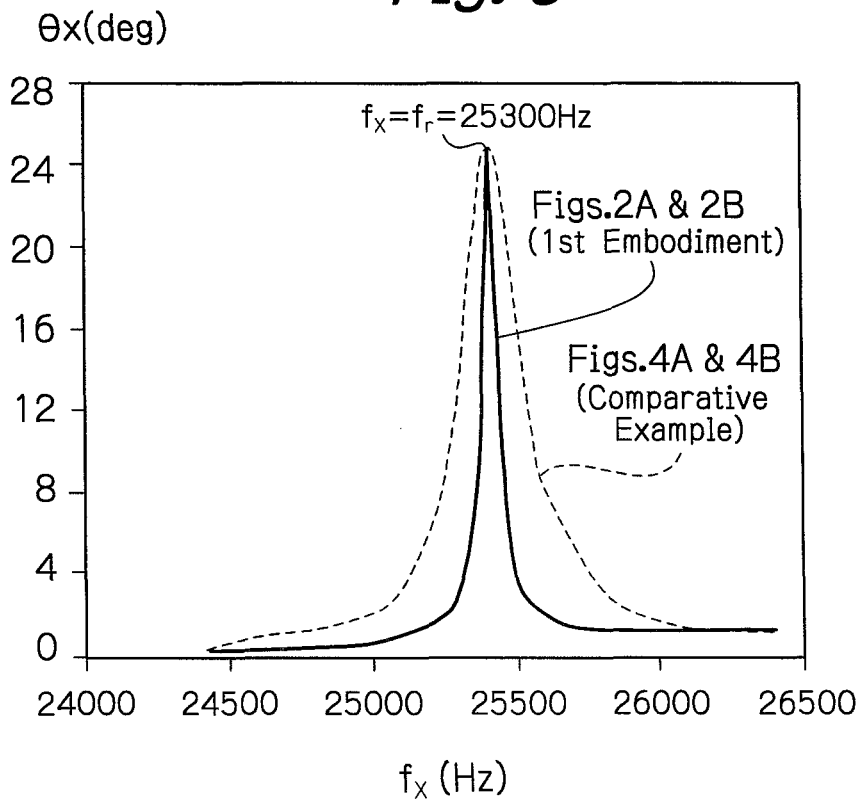
FIG. 6 is a diagram illustrating drive voltage frequency-to-deflection angle characteristics between the optical deflector of FIGS. 2A and 2B and the comparative example of FIGS. 4A and 4B.

In FIG. 6, which shows a relationship between the frequency $f_X$ of the drive voltages $V_{X1}$ and $V_{X2}$ and the deflection angle $\theta_X$ of the optical deflectors of FIGS. 2A and 2B and FIGS. 4A and 4B, the maximum deflection angle $\theta_X$ is 24°. In any case, since the deflection angle $\theta_X$ is in proportion to the vibration energy, i.e., the frequency $f_X$ of the drive voltages $V_{X1}$ and $V_{X2}$, the quality factor Q of the optical deflector of FIGS. 2A and 2B is larger than that of the optical deflector of FIGS. 4A and 4B. In FIG. 6, the quality factor Q of the optical deflector of FIGS. 2A and 2B was 635, while the quality factor Q of the optical deflector of FIGS. 4A and 4B was 127.

Thus, the circumferential rib 7 and the branch ribs 8a and 8b would decrease the drive voltages $V_{X1}$ and $V_{X2}$ in FIG. 5 and increase the quality factor Q in FIG. 6, which would decrease the drive energy of the inner piezoelectric actuators 4a and 4b, thus improving the rocking controllability of the mirror 1 around the X-axis.

Even in the optical deflector of FIGS. 4A and 4B, note that the operation modes P1 and P2 of FIG. 3 were observed.

Figure 7A:
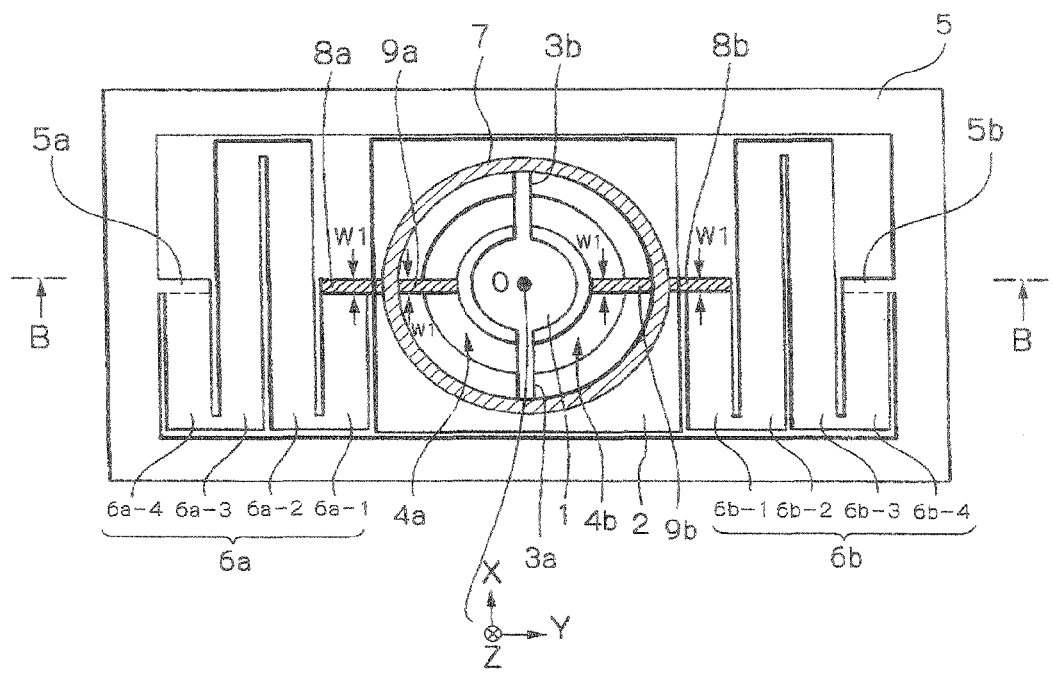
FIG. 7A is a rear-side view illustrating a second embodiment of the optical deflector according to the presently disclosed subject matter.
Figure 7B:
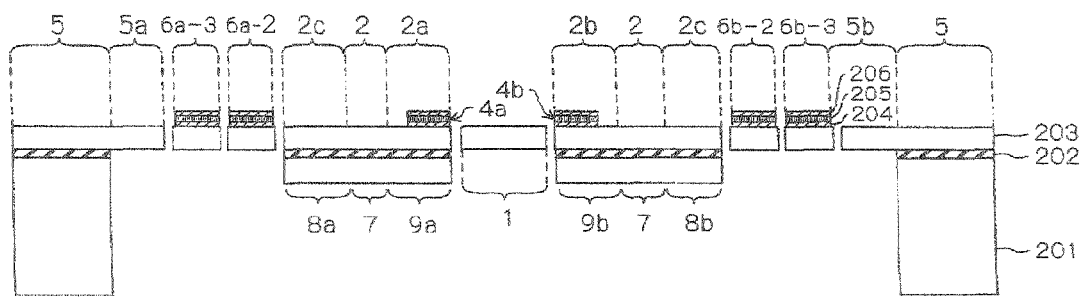
FIG. 7B is a cross-sectional view taken along the line B-B in FIG. 7A.

FIG. 7A is a rear-side view illustrating a second embodiment of the optical deflector according to the presently disclosed subject matter, and FIG. 7B is a cross-sectional view taken along the line B-B in FIG. 7A.

In FIGS. 7A and 7B, branch ribs 9a and 9b are added to the optical deflector of FIGS. 2A and 2B. The branch ribs 9a and 9b are provided from the inner circumference of the circumferential rib 7 to the inner coupling portions 2a and 2b of the inner frame 2 along the Y-axis. In FIG. 7A, note that the branch ribs 9a and 9b are shaded to easily specify them. The thickness of the inner frame 2 including the circumferential rib 7 is the same as that of the inner coupling portions 2a and 2b including the branch ribs 9a and 9b. Also, the width of the branch ribs 9a and 9b including the outer coupling portions 2a and 2b is W1, i.e., 120 µm.

The branch ribs 9a and 9b are also formed by a part of the the "Handle" layer 201, in the same way as the circumferential rib 7 and the branch ribs 8a and 8b of FIGS. 2A and 2B.

Figure 8:
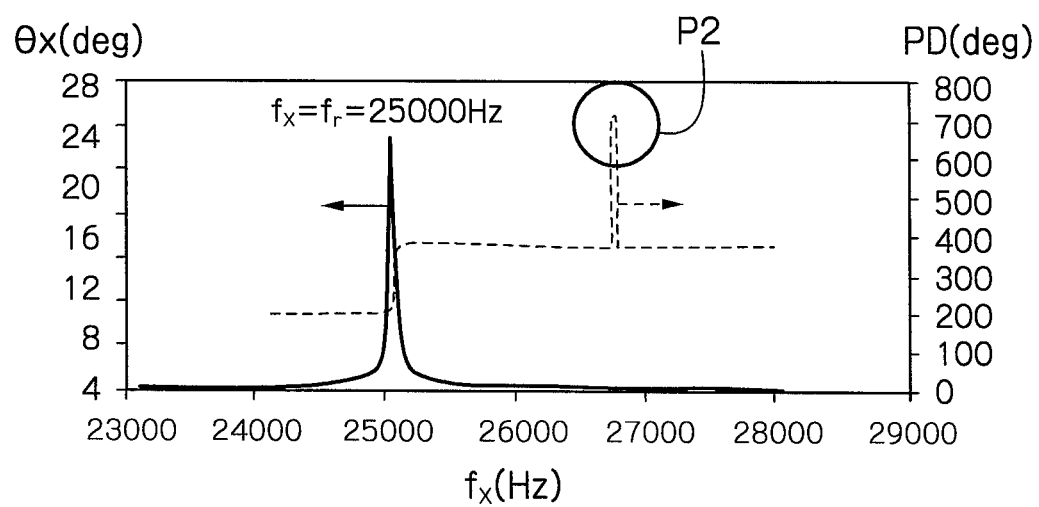
FIG. 8 is a graph showing the deflection angle with respect to the X-axis and a phase difference between the phase of the drive voltages and the deflection angle signal of FIGS. 7A and 7B.

When the optical deflector of FIGS. 7A and 7B was driven by applying the drive voltages $V_{X1}$ and $V_{X2}$ whose frequency $f_X$ was changed from 24 kHz to 28 kHz, a relationship between the deflection angle $\theta_X$ with respect to the X-axis, and a phase difference PD between the phase of the drive voltages $V_{X1}$ and $V_{X2}$, and the deflection angle signal, were obtained as illustrated in FIG. 8.

In FIG. 8, the pumping mode P1 as illustrated in FIG. 3 was removed. It is considered that the translation mode of the mirror 1 along the Z-axis is suppressed by the branch ribs 9a and 9b. However, even in the optical deflector of FIGS. 7A and 7B, the operation mode P2 due to the motion of the meander-type outer piezoelectric actuators 6a and 6b along the X-axis as illustrated in FIG. 3 was not removed.

Figure 9A:
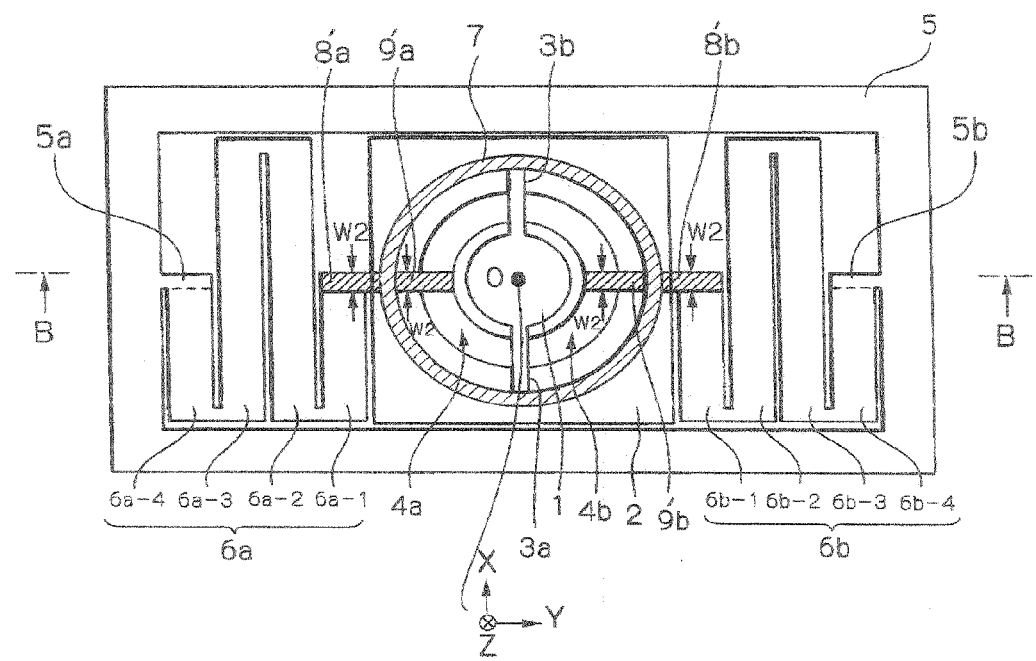
FIG. 9A is a rear-side view illustrating a third embodiment of the optical deflector according to the presently disclosed subject matter.
Figure 9B:
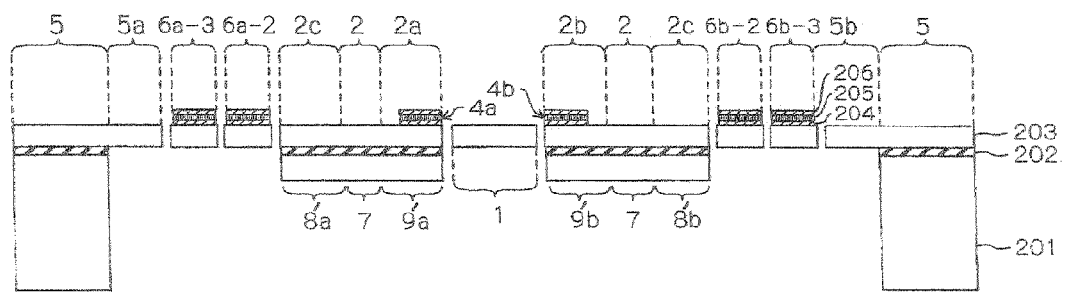
FIG. 9B is a cross-sectional view taken along the line B-B in FIG. 9A.

FIG. 9A is a rear-side view illustrating a third embodiment of the optical deflector according to the presently disclosed subject matter, and FIG. 9B is a cross-sectional view taken along the line B-B in FIG. 9A.

In FIGS. 9A and 9B, the branch ribs 8a, 8b, 9a and 9b having the width W1 of FIGS. 7A and 7B are replaced by branch ribs 8'a, 8' b, 9'a and 9'b, respectively, whose width W2 is larger than W1. For example, W2=320 µm~400 µm. Even in this case, the thickness of the branch ribs 8'a, 8'b, 9'a and 9'b is the same as that of the branch ribs 8a, 8b, 9a and 9b of FIGS. 7A and 7B.

Figure 10:
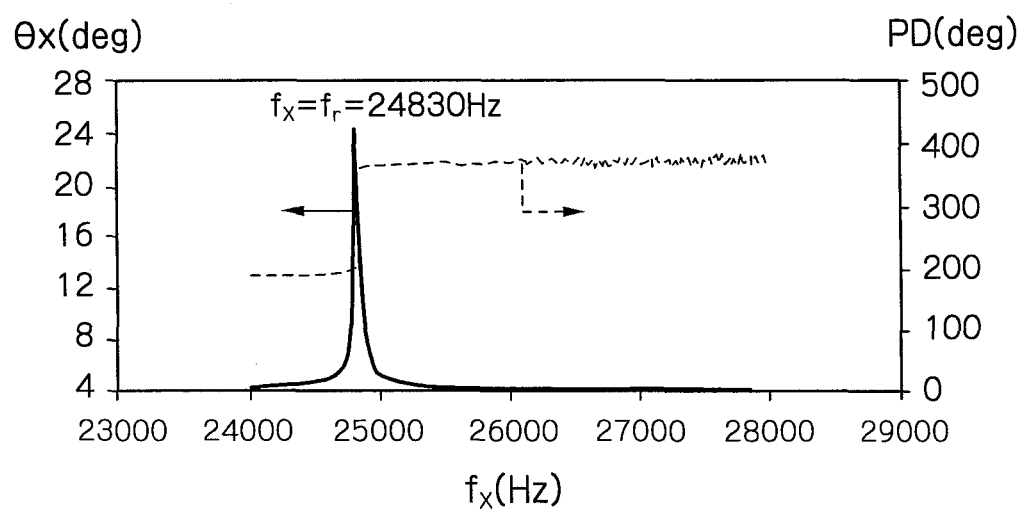
FIG. 10 is a graph showing the deflection angle with respect to the X-axis and a phase difference between the phase of the drive voltages and the deflection angle signal of FIGS. 9A and 9B.

When the optical deflector of FIGS. 9A and 9B was driven by applying the drive voltages $V_{X1}$ and $V_{X2}$ whose frequency $f_X$ was changed from 24 kHz to 28 kHz, a relationship between the deflection angle $\theta_X$ with respect to the X-axis, and a phase difference PD between the phase of the drive voltages $V_{X1}$ and $V_{X2}$ and the deflection angle signal, were obtained as illustrated in FIG. 10.

In FIG. 10, the pumping mode P1 as illustrated in FIG. 3 was removed. Additionally, the operation mode P2 due to the motion of the meander-type outer piezoelectric actuators 6a and 6b along the X-axis as illustrated in FIG. 3 was removed by the larger width W2 of the branch ribs 8'a, 8'b, 9'a and 9'b.

Figure 11A:
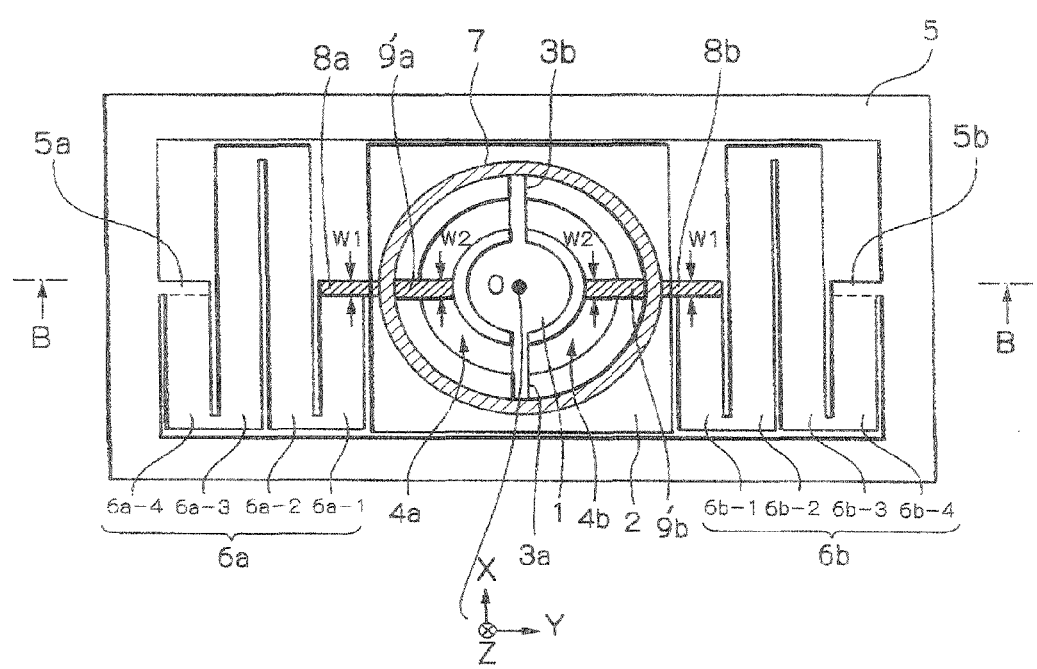
FIG. 11A is a rear-side view illustrating a fourth embodiment of the optical deflector according to the presently disclosed subject matter.
Figure 11B:
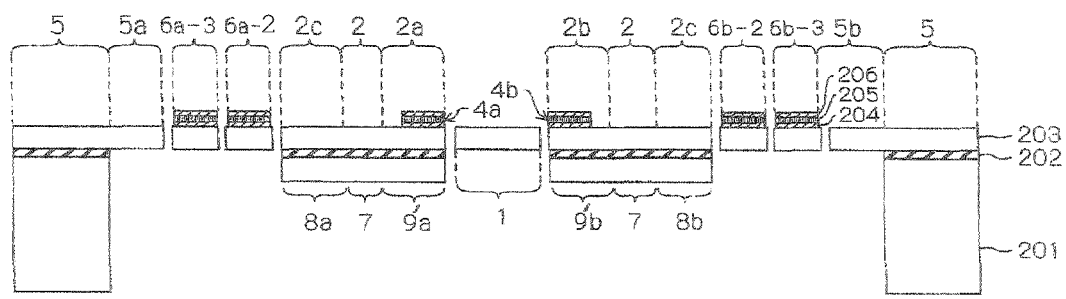
FIG. 11B is a cross-sectional view taken along the line B-B in FIG. 11A.

FIG. 11A is a rear-side view illustrating a fourth embodiment of the optical deflector according to the presently disclosed subject matter, and FIG. 11B is a cross-sectional view taken along the line B-B in FIG. 11A.

In FIGS. 11A and 11B, the branch ribs 9a and 9b having the width W1 of FIGS. 7A and 7B are replaced by branch ribs 9'a and 9'b, respectively, whose width W2 is larger than W1. For example, W2=320 μm~400 μm. Even in this case, the thickness of the branch ribs 9'a and 9'b is the same as that of the branch ribs 9a and 9b of FIGS. 7A and 7B.

Figure 12:
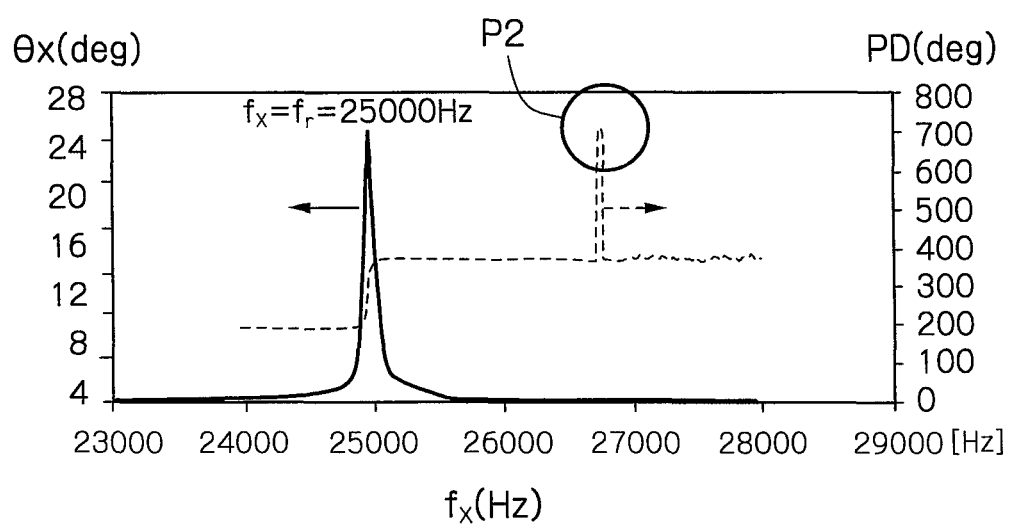
FIG. 12 is a graph showing the deflection angle with respect to the X-axis and a phase difference between the phase of the drive voltages and the deflection angle signal of FIGS. 11A and 11B.

When the optical deflector of FIGS. 11A and 11B was driven by applying the drive voltages $V_{X1}$ and $V_{X2}$ whose frequency $f_X$ was changed from 24 kHz to 28 kHz, a relationship between the deflection angle $\theta_X$ with respect to the X-axis, and a phase difference PD between the phase of the drive voltages $V_{X1}$ and $V_{X2}$ and the deflection angle signal, were obtained as illustrated in FIG. 12.

In FIG. 12, the pumping mode P1 as illustrated in FIG. 3 was removed. However, the operation mode P2 due to the motion of the meander-type outer piezoelectric actuators 6a and 6b along the X-axis as illustrated in FIG. 3 was not removed by the larger width W2 of the branch ribs 9' a and 9' b. That is, in view of FIGS. 9A and 9B and FIGS. 11A and 11B, in order to remove the operation mode P2 as illustrated in FIG. 3, it is considered that the branch ribs 8' a and 8' b having the larger width W2 of FIGS. 9A and 9B are required.

Figure 13A:
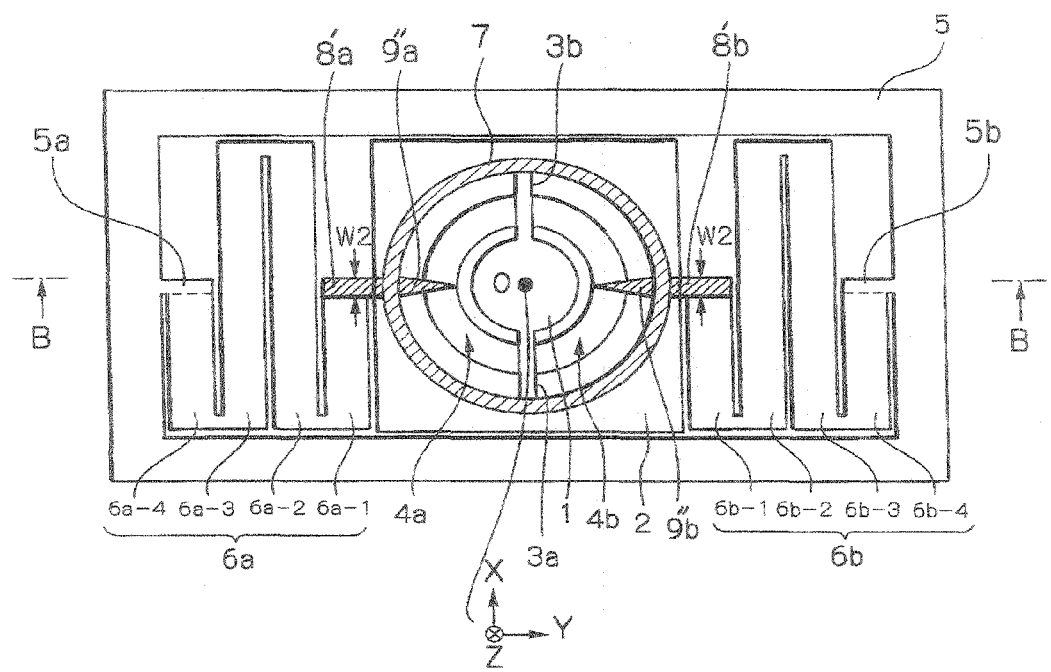
FIG. 13A is a rear-side view illustrating a fifth embodiment of the optical deflector according to the presently disclosed subject matter.
Figure 13B:
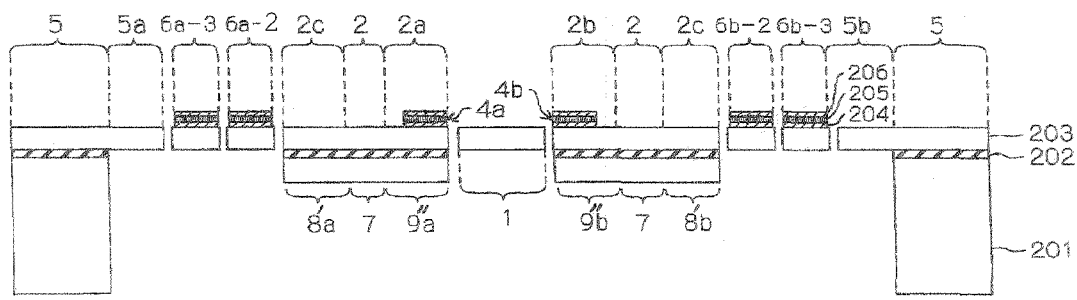
FIG. 13B is a cross-sectional view taken along the line B-B in FIG. 13A.

FIG. 13A is a rear-side view illustrating a fifth embodiment of the optical deflector according to the presently disclosed subject matter, and FIG. 13B is a cross-sectional view taken along the line B-B in FIG. 13A.

In FIGS. 13A and 13B, the branch ribs 8a and 8b having the width W1 of FIGS. 7A and 7B are replaced by branch ribs 8' a and 8' b, respectively, whose width W2 is larger than W1. For example, W2=320 μm~400 μm. Also, the branch ribs 9a and 9b having the width W1 of FIGS. 7A and 7B are replaced by isosceles triangular branch ribs 9"a and 9"b, respectively. Even in this case, the thickness of the branch ribs 8'a, 8'b, 9"a and 9"b is the same as that of the branch ribs 8a, 8b, 9a and 9b of FIGS. 7A and 7B.

Figure 14:
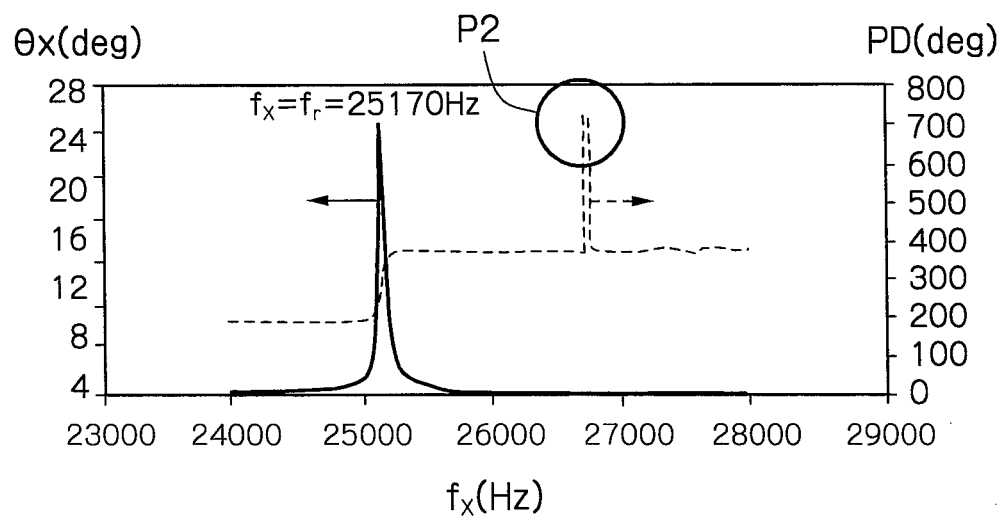
FIG. 14 is a graph showing the deflection angle with respect to the X-axis and a phase difference between the phase of the drive voltages and the deflection angle signal of FIGS. 13A and 13B.

When the optical deflector of FIGS. 13A and 13B was driven by applying the drive voltages $V_{X1}$ and $V_{X2}$ whose frequency $f_X$ was changed from 24 kHz to 28 kHz, a relationship between the deflection angle $\theta_X$ with respect to the X-axis, and a phase difference PD between the phase of the drive voltages $V_{X1}$ and $V_{X2}$ and the deflection angle signal, were obtained as illustrated in FIG. 14.

In FIG. 14, the pumping mode P1 as illustrated in FIG. 3 was removed. However, the operation mode P2 due to the motion of the meander-type outer piezoelectric actuators 6a and 6b along the X-axis as illustrated in FIG. 3 was not removed by the larger width W2 of the branch ribs 8'a and 8'b. That is, in view of FIGS. 9A and 9B and FIGS. 13A and 13B, in order to remove the operation mode P2 as illustrated in FIG. 3, it is considered that the branch ribs 9'a and 9'b having the larger width W2 of FIGS. 9A and 9B are required.

Figure 15A:
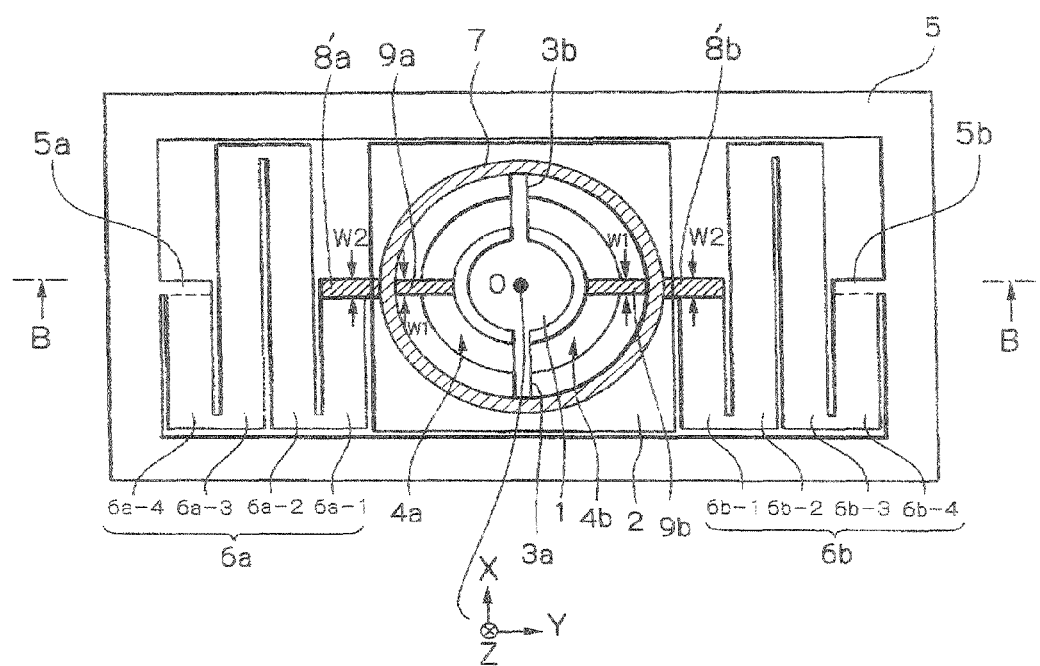
FIG. 15A is a rear-side view illustrating a sixth embodiment of the optical deflector according to the presently disclosed subject matter.
Figure 15B:
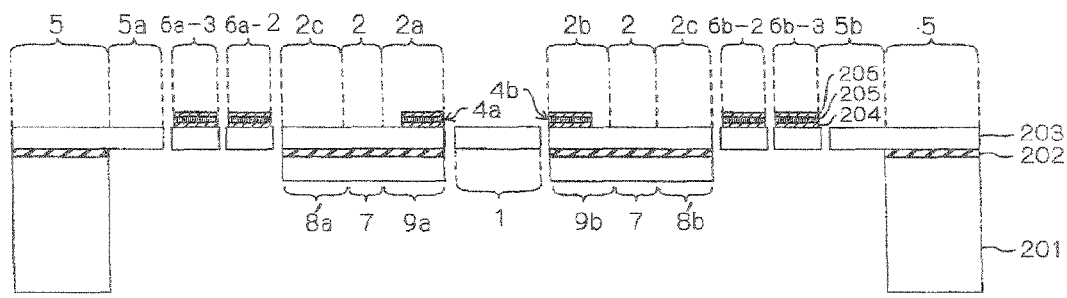
FIG. 15B is a cross-sectional view taken along the line B-B in FIG. 15A.

FIG. 15A is a rear-side view illustrating a sixth embodiment of the optical deflector according to the presently disclosed subject matter, and FIG. 15B is a cross-sectional view taken along the line B-B in FIG. 15A.

In FIGS. 15A and 15B, the branch ribs 8a and 8b having the width W1 of FIGS. 7A and 7B are replaced by branch ribs 8' a and 8' b, respectively, whose width W2 is larger than W1. For example, W2=320 μm~400 μm. Even in this case, the thickness of the branch ribs 8' a and 8' b is the same as that of the branch ribs 8a and 8b of FIGS. 7A and 7B.

Figure 16:
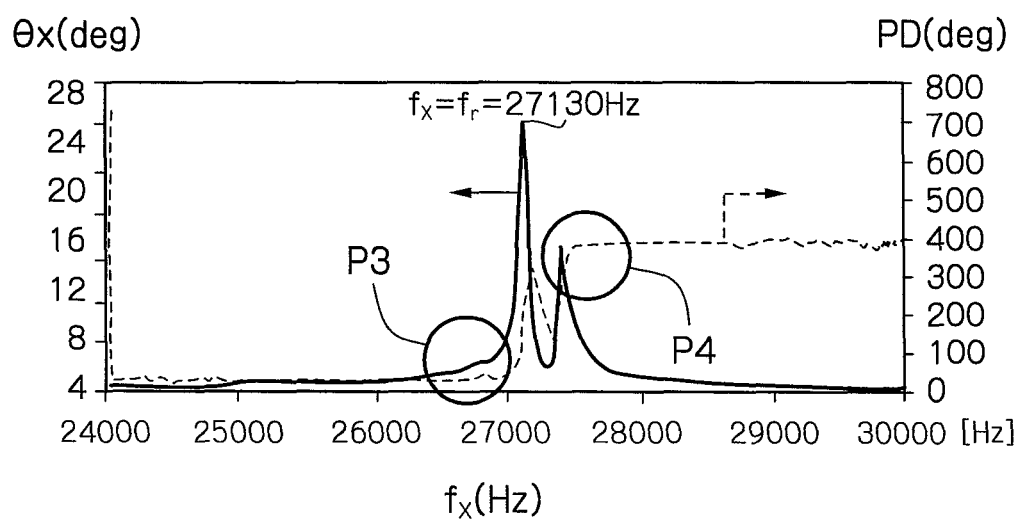
FIG. 16 is a graph showing the deflection angle with respect to the X-axis and a phase difference between the phase of the drive voltages and the deflection angle signal of FIGS. 15A and 15B.

When the optical deflector of FIGS. 15A and 15B was driven by applying the drive voltages $V_{X1}$ and $V_{X2}$ whose frequency $f_X$ was changed from 24 kHz to 28 kHz, a relationship between the deflection angle $\theta_X$ with respect to the X-axis, and a phase difference PD between the phase of the drive voltages $V_{X1}$ and $V_{X2}$ and the deflection angle signal, were obtained as illustrated in FIG. 16.

In FIG. 16, the pumping mode P1 as illustrated in FIG. 3 was removed. Additionally, the operation mode P2 due to the motion of the meander-type outer piezoelectric actuators 6a and 6b along the X-axis as illustrated in FIG. 3 was removed by the larger width W2 of the branch ribs 8'a and 8'b. However, undesired operation modes P3 and P4 were generated. Therefore, in order to remove the operation mode P2 without the generation of the undesired operation modes P3 and P4, in view of FIGS. 9A and 9B and FIGS. 15A and 15B, the branch ribs 9a and 9b having the small width W1 need to be replaced by the branch ribs 9'a and 9'b having the larger width W2.

Although each of the above-described embodiments relates to a two-dimensional optical deflector, the presently disclosed subject matter can also be applied to a one-dimensional optical deflector where the outer coupling portions 2c and 2d of the inner frame 2 are directly coupled to the outer frame 5 without the meander-type outer piezoelectric actuators 6a and 6b.

Figure 17A:
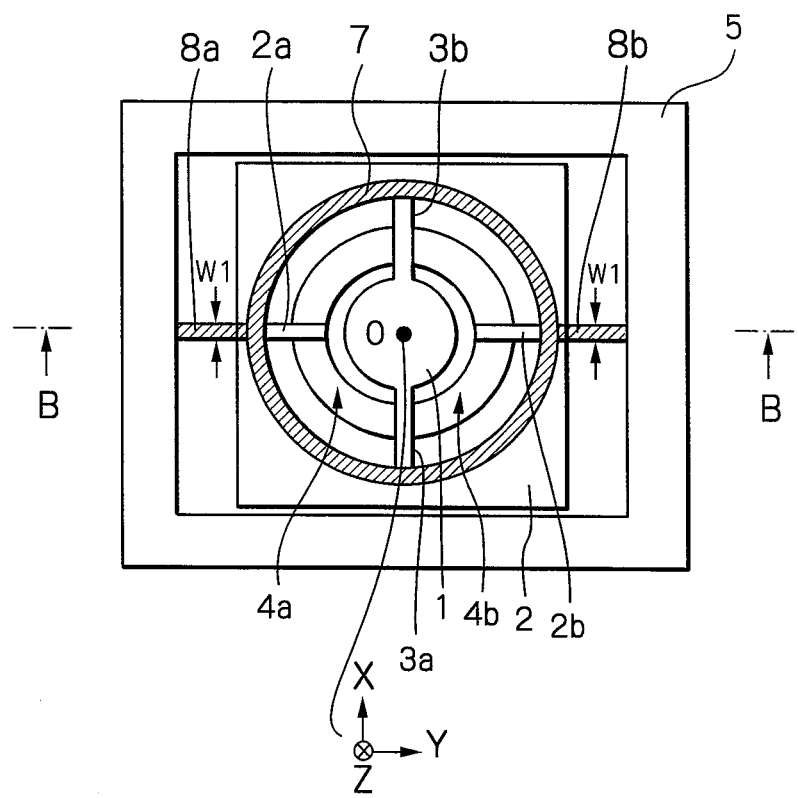
FIG. 17A is a rear-side view illustrating a modification of the optical deflector of FIG. 2A.
Figure 17B:
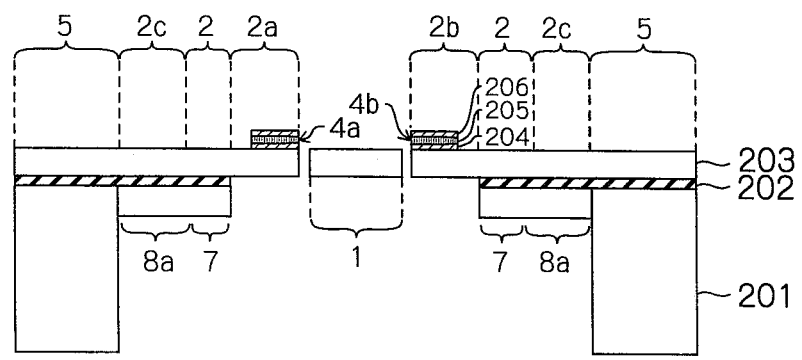
FIG. 17B is a cross-sectional view taken along the line B-B in FIG. 17A.

For example, the two-dimensional optical deflector of FIGS. 2A and 2B including the circumferential rib 7 and the branch ribs 8a and 8b is modified to a one-dimensional optical deflector as illustrated in FIGS. 17A and 17B. Note that FIG. 17A is a rear-side view and FIG. 17B is a cross-sectional view taken along the line B-B in FIG. 17A. In FIGS. 17A and 17B, the outer coupling portions 8a and 8b are directly coupled to the outer frame 5 without meander-type outer piezoelectric actuators.

Figure 18A:
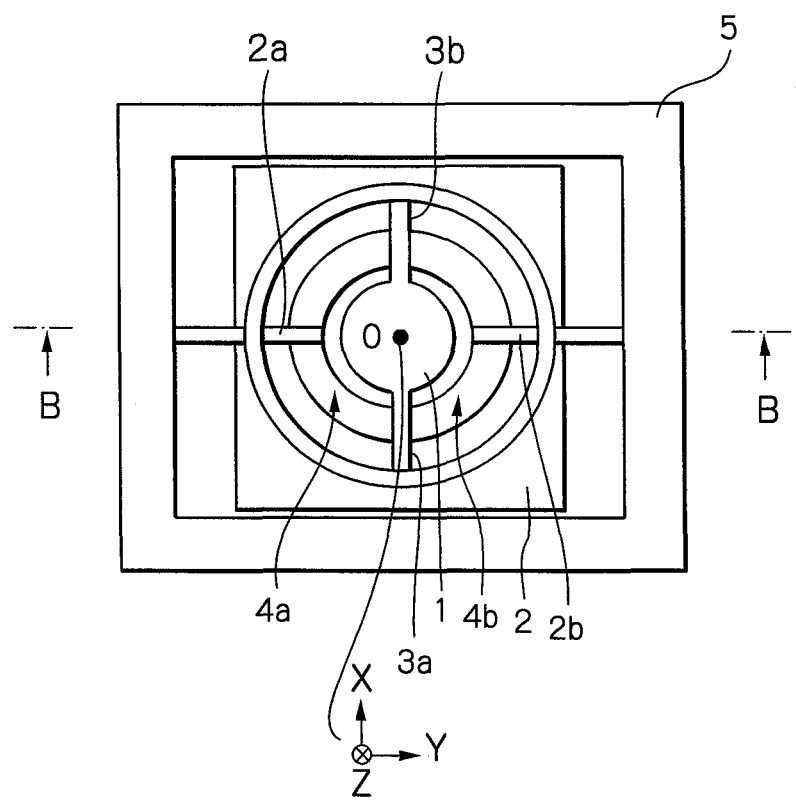
FIG. 18A is a rear-side view of a comparative example against the optical deflector of FIG. 17A.
Figure 18B:
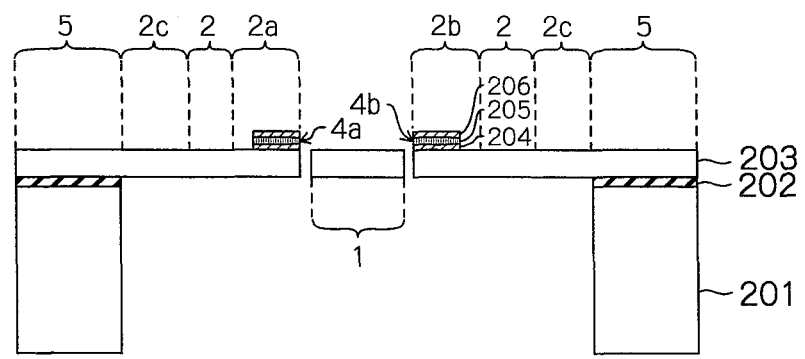
FIG. 18B is a cross-sectional view taken along the line B-B in FIG. 18A.

An example in comparison with the optical deflector of FIGS. 17A and 17B is illustrated in FIGS. 18A and 18B where the circumferential rib 7 and the branch ribs 8a and 8b are removed.

Figure 19:
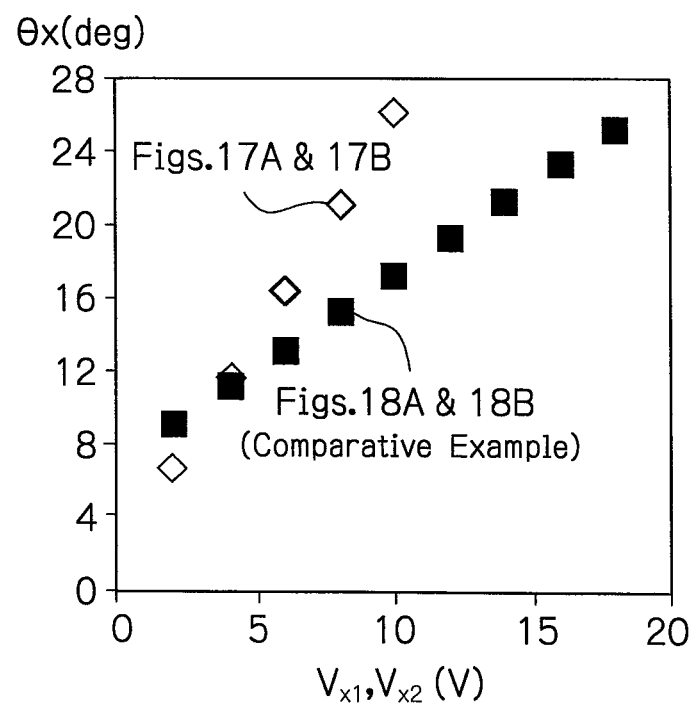
FIG. 19 is a diagram illustrating drive voltage-to-deflection angle characteristics between the optical deflector of FIGS. 17A and 17B and the comparative example of FIGS. 18A and 18B.

As illustrated in FIG. 19, when the drive voltages $V_{X1}$ and $V_{X2}$ applied to the inner piezoelectric actuators 4a and 4b is lower than 4 V, the deflection angle $\theta_X$ of the optical deflector of FIGS. 17A and 17B is smaller than the deflection angle $\theta_X$ of the optical deflector of FIGS. 18A and 18B. However, when the drive voltages $V_{X1}$ and $V_{X2}$ are higher than 4 V, the deflection angle $\theta_X$ can be increased by the optical deflector of FIGS. 17A and 17B. In other words, in order to realize the same deflection angle $\theta_X$ such as 24°, the optical deflector of FIGS. 17A and 17B is driven by $V_{X1}=V_{X2}=10$ V, while the optical deflector of FIGS. 18A and 18B is driven by $V_{X1}=V_{X2}=15$ V. Thus, the drive voltages $V_{X1}$ and $V_{X2}$ can be decreased to decrease the power consumption.

In the above-described embodiments, although the circumferential rib 7 is provided in an inner circumference portion of the inner frame 2, the circumferential rib 7 can be in a center circumference portion or an outer circumference portion of the inner frame 2. However, the provision of the circumferential rib 7 in the inner circumference portion of the inner frame 2 is preferable in consideration of the lightness in weight of the optical deflector.

Also, in the above-described embodiments, the X-axis and the Y-axis are perpendicular to each other; however, the angle between the X-axis and the Y-axis can be changed depending upon the shape of the mirror 1.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. An optical deflector comprising:
    a mirror having first and second axes on a plane of said mirror;
    an inner frame surrounding said mirror;
    first and second torsion bars coupled between said mirror and said inner frame along said first axis;
    a first inner piezoelectric actuator coupled between said first and second torsion bars and supported by a first inner coupling portion to said inner frame;
    a second inner piezoelectric actuator coupled between said first and second torsion bars and supported by a second inner coupling portion to said inner frame, said second inner coupling portion being opposite to said first inner coupling portion with respect to said first axis;
    an outer frame surrounding said inner frame, said inner frame being supported by first and second outer coupling portions to said outer frame, said first and second outer coupling portions being opposite with respect to said first axis;
    a circumferential rib provided on a rear surface of said inner frame;
    a first branch rib provided on a rear surface of said first outer coupling portion;
    a second branch rib provided on a rear surface of said second outer coupling portion, said first and second inner coupling portions and said first and second outer coupling portions being arranged along said second axis;
    a first outer piezoelectric actuator coupled between said first outer coupling portion and said outer frame; and
    a second outer piezoelectric actuator coupled between said second outer coupling portion and said outer frame,
    wherein:
    said first and second outer piezoelectric actuators rock said mirror around said second axis via said inner frame,
    each of said first and second outer piezoelectric actuators comprises a plurality of folded piezoelectric cantilevers in parallel with said first axis, and
    a width of outermost ones of said piezoelectric cantilevers is half of a width of other ones of said piezoelectric cantilevers.

2. The optical deflector as set forth in claim 1, wherein said first and second branch ribs are coupled to said circumferential rib.

3. The optical deflector as set forth in claim 1, further comprising:
    a third branch rib provided on a rear surface of said first inner coupling portion; and
    a fourth branch rib provided on a rear surface of said second inner coupling portion.

4. The optical deflector as set forth in claim 3, wherein said third and fourth branch ribs are coupled to said circumferential rib.

5. The optical deflector as set forth in claim 1, wherein said circumferential rib is provided in an inner circumference portion of said inner frame.

6. The optical deflector as set forth in claim 3, wherein a width of each of said first, second, third and fourth branch ribs is 320 µm to 400 µm.

7. The optical deflector as set forth in claim 1, wherein said first and second axes are perpendicular to each other.

* * * * *